Nov. 20, 1956 F. HACKNEY 2,770,883

END TERMINALS FOR TAPE LINES

Filed April 5, 1955

INVENTOR.
FLOYD HACKNEY
BY
[signature]
ATTORNEY

United States Patent Office 2,770,883
Patented Nov. 20, 1956

2,770,883

END TERMINALS FOR TAPE LINES

Floyd Hackney, Portland, Oreg.

Application April 5, 1955, Serial No. 499,320
3 Claims. (Cl. 33—137)

This invention relates to end terminals for tape lines and more particularly to terminals for steel tape lines of the type used by carpenters, masons and the like.

The primary object of the invention is to provide on a tape or the like an end terminal that can be placed against or hooked over the edge of an object and the distance from the object read directly from the tape without calculating for any allowance relative to the terminal.

A further object of the invention is to provide a terminal that will hook over a nail or other object and will not come loose from the said nail or object.

A still further object of the invention is to provide a terminal on the end of a tape line that will connect two tape lines together in such a manner that they will stay together and the reading on the scale can be read directly therefrom without calculating for errors caused by the terminal.

The novel features that are considered characteristic of the invention are set forth with particularity in the appended claims. The invention itself, however both as to its organization and its method of operation, together with additional objects and advantages thereof, will best be understood from the following description of a specific embodiment when read in connection with the accompanying drawing, wherein like reference characters indicate like parts through the several figures and in which:

Figures 1, 2:
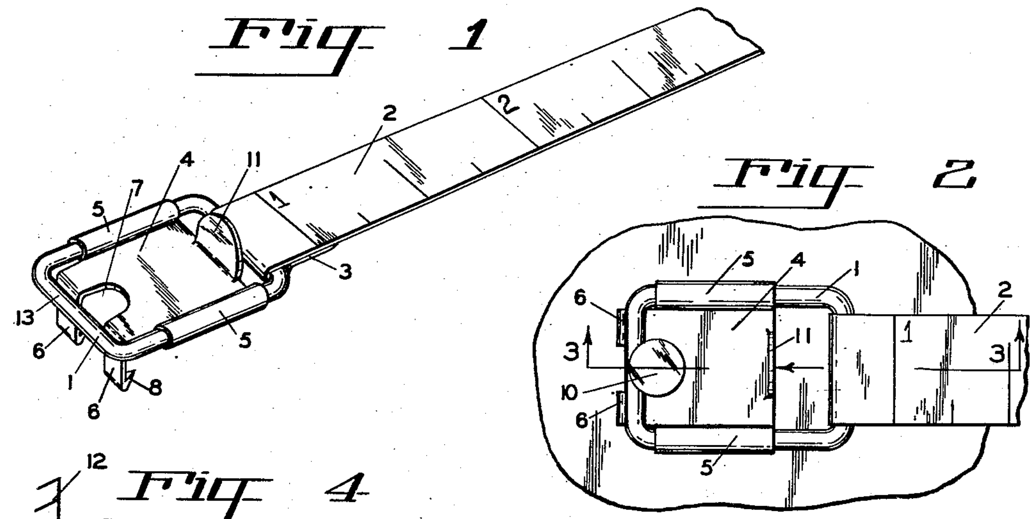
Figure 1 is a perspective view of a portion of a tape having a terminal element in accordance with the present invention.
Figure 2 is a plan view of the terminal hooked over a nail or pin.

Referring specifically to the drawing, a tape end terminal in accordance with the present invention comprises a rectangular loop 1 preferably formed of round stock and a plate member 4 slidably supported by the loop 1. A tape line 2 may be connected to the loop 1 in the usual manner, as by a fold or loop 3. The body or plate member 4 has lateral extensions on opposite sides which are rolled around the side runs of the loop 1 in the form of sleeves 5. These sleeves have a friction fit on the loop runs so that they will retain the plate 4 in any fixed position relative to the loop 1.

Plate 4 is provided at its end adjacent the free end 13 of the loop 1 with fingers 6 which are bent substantially perpendicularly to form hooks; the free ends of the fingers being again bent perpendicularly and rearwardly and tapered to provide penetrating points 8. The hook forming bends of the fingers 6 are spaced from the body of the plate 4 to provide a notch 7 in said plate and between said fingers. An ear 11 is provided on the rear edge of said plate and turned upwardly to form a finger grip for moving the plate 4 forward and backward on the loop 1.

Figure 3:
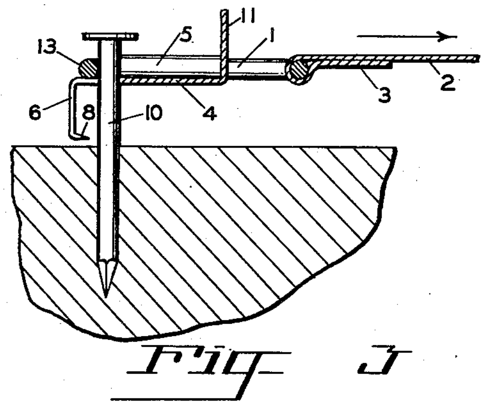
Figure 3 is a cross-sectional view corresponding to line 3—3 of Figure 2.

In use, the tape terminal may be applied in various manners. For example, the terminal may be hooked to a pin or nail 10, as shown in Figures 2 and 3, and after the loop is positioned around the nail the plate 4 is pulled by the ear 11 towards the end 13 of the loop 1, latching the terminal on the nail. When the plate 4 is moved forward to latching position, as shown in Figure 2, the fingers 6 straddle the nail 10 so that it is embraced within the notch 7 and the terminal is centered relative to the nail and prevents twisting of the tape and inaccurate measurement.

Figures 4, 5:
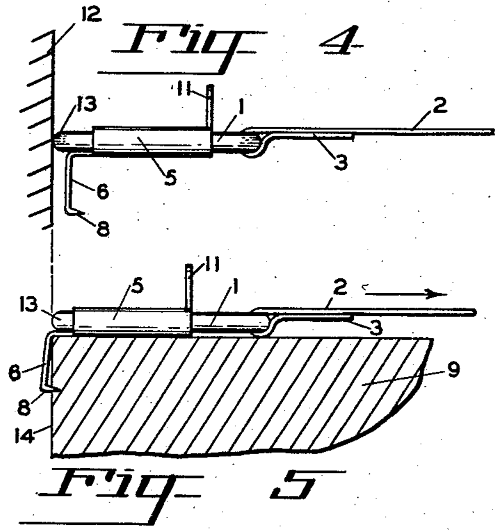
Figure 4 is a side view of the tape terminal abutted against an object wherein a direct reading of the distance can be made from the scale of the tape from the tip of the terminal.
Figure 5 is a side view of the terminal hooked over an object and aligning the end of the terminal with the edge of the object so that a direct reading can be taken from the tape.

In another manner of use, as shown in Figure 4, the free end of the terminal, that is the free end 13 of the loop 1, may be placed in abutting relation against an object 12, the plate 4 being retracted to prevent interference by the fingers 6. The outer edge of the free end 13 of the loop is so arranged as to measure one inch from the inch line on the tape.

Conversely, as illustrated in Figure 5, the fingers 6 may be hooked over the edge 14 of the object 9 with the penetrating points 8 piercing the object slightly so as to prevent the terminal unit from slipping. When used in this manner, the plate 4 is moved forwardly to the limit permitted by the sleeves 5 and the hooked fingers 6 project beyond the free end 13 of the loop 1. When so applied the end 13 of loop 1 lines up with the edge 14 of the object 9, enabling an accurate reading directly from the scale.

Figure 6:
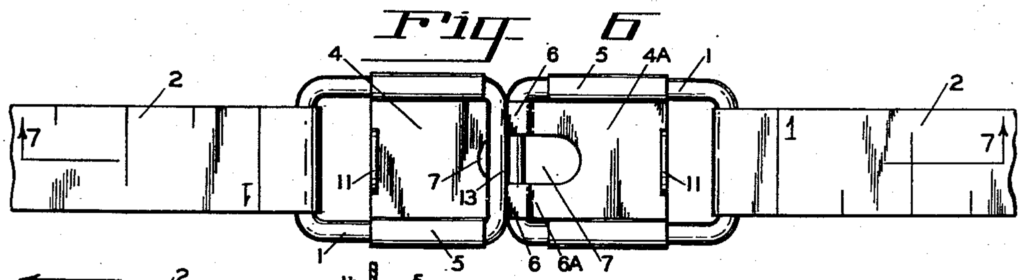
Figure 6 is a plan view of the terminals of two tape lines hooked together.
Figure 7:
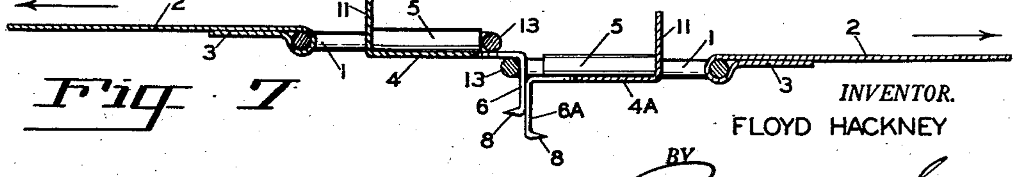
Figure 7 is a cross-sectional view corresponding to line 7—7 of Figure 6.

In still another mode of use, the fingers 6 of one tape may be hooked over the end 13 of the loop 1 of an oppositely disposed tape; as shown in Figure 6, the plate 4A of the oppositely disposed tape then being moved forwardly until its fingers 6A abut the fingers 6 of the first tape and latch the ends of the two tapes together.

It will be noted that regardless of the manner in which the terminal is applied, an accurate measurement from the free end 13 of the terminal loop 1 may be obtained and that this accurate measurement may be obtained by a single person or operator.

Although a certain specific embodiment of the invention has been shown and described, it is obvious that many modifications thereof are possible. The invention, therefore is not to be restricted except insofar as is necessitated by the prior art and by the spirit of the appended claims.

What I claim is:

1. An end terminal for a tape line comprising a substantially rectangular loop member for attachment to one end of the tape, a plate having rolled side edges slidably and frictionally embracing the opposite sides of the loop member, fingers projecting downwardly from one edge of the plate below the loop member and an upturned ear projecting upwardly from the other edge of the plate for moving the plate forward and backward on the loop member, thereby sliding the fingers forwardly or rearwardly of the front branch of the loop member.

2. A device as set forth in claim 1, said plate having a cut out portion next to the projecting fingers for receiving a nail or similar object for hooking on the end terminal of the tape line.

3. An end terminal as set forth in claim 2 comprising penetrating points or teeth projecting rearwardly from the lower edges of the fingers.

References Cited in the file of this patent

UNITED STATES PATENTS

| | | |
|---|---|---|
| 1,631,682 | Hoffstetter | June 7, 1927 |
| 1,723,739 | Langsner | Aug. 6, 1929 |
| 1,798,476 | Langsner | Mar. 31, 1931 |